(12) United States Patent
Chen

(10) Patent No.: US 6,272,011 B1
(45) Date of Patent: Aug. 7, 2001

(54) HARD DISKDRIVE MOBILE RACK

(76) Inventor: Star Chen, 4F., No. 14, Alley 5, Lane 130, Sec. 3, Nan Gand Rd., Taipei City (TW)

( * ) Notice: Subject to any disclaimer, the term of this patent is extended or adjusted under 35 U.S.C. 154(b) by 0 days.

(21) Appl. No.: 09/455,944

(22) Filed: Dec. 7, 1999

(51) Int. Cl.[7] .................................................. G06F 1/16
(52) U.S. Cl. ...................... 361/685; 248/611; 248/634; 360/97.01; 364/708.1; 361/680
(58) Field of Search .................................. 361/685, 680, 361/683; 240/60, 581, 609; 248/611, 615, 634, 635, 638; 360/97.01, 137; 364/708.1

(56) References Cited

U.S. PATENT DOCUMENTS

| | | | |
|---|---|---|---|
| 5,349,483 | * | 9/1994 | Tsai ........................................ 361/685 |
| 5,959,834 | * | 9/1999 | Chang .................................... 361/685 |
| 6,064,567 | * | 5/2000 | Cheng .................................... 361/685 |

* cited by examiner

Primary Examiner—Leo P. Picard
Assistant Examiner—Hung Van Duong
(74) Attorney, Agent, or Firm—Bacon & Thomas, PLLC

(57) ABSTRACT

A hard diskdrive mobile rack formed of a hollow rack, a top cover and a buffer unit for mounting in the mainframe of a computer to carry a hard diskdrive for storing data, wherein the rack body has an opening for the loading of a hard diskdrive, and an electric connector for connection to the circuit of the mainframe of the computer; the top cover is slidably inserted into the rack body to close the opening of the rack body; the buffer unit includes a tray, which carries the loaded hard diskdrive, and a plurality of spring elements, which support the tray and the loaded had diskdrive in the rack body to eliminate shocks.

14 Claims, 5 Drawing Sheets

HARD DISKDRIVE MOBILE RACK

BACKGROUND OF THE INVENTION

The present invention relates to a hard diskdrive mobile rack, and more particularly to such a hard diskdrive mobile rack, which has means to eliminate shocks.

Following fast development information industry and business, people may travel from place to place and use a computer to process data. Because a desk computer is of low mobility and a mobile computer (notebook computer) is expensive, people may use a hard diskdrive mobile rack for carrying data between different working places. Because safety and integrity of the internal data of a hard diskdrive has a great concern with the operation and data processing of the computer mainframe, vibration of the hard diskdrive must be kept eliminated. Conventional hard diskdrives are not equipped with shock absorbing means. A severe vibration may cause the internal data of the diskdrive to be damaged. Recently, there are known hard diskdrives with shock-absorbing means. However, the limited shock absorbing effect of the shock absorbing means cannot well protect these hard diskdrives against severe shocks.

SUMMARY OF THE INVENTION

It is one object of the present invention to provide a hard diskdrive mobile rack, which has means to protect the hard diskdrive against shocks. It is another object of the present invention to provide a hard diskdrive mobile rack, which enhances the grounding of the hard diskdrive to eliminate interference. According to the present invention, the hard diskdrive mobile rack is designed for mounting in the mainframe of a computer to carry a hard diskdrive for storing data, and comprised of a hollow rack, a top cover, and a buffer unit. The rack body comprises an opening through which a hard diskdrive is inserted into the inside of the rack body, a plurality of air vents for dissipation of heat from the loaded hard diskdrive, a plurality of coupling holes, and an electric connector for connection to the mainframe of the computer electrically. The heat-resisting top cover is made of heat-resisting material, and detachably coupled to the rack body by positioning means to close/open the opening of the rack body. The buffer unit supports the loaded hard diskdrive in the rack body and eliminates shocks from the hard diskdrive, comprised of a tray, which holds the loaded hard diskdrive in the rack body, and a plurality of spring elements, which support the tray in the rack body. The tray comprises a plurality of coupling elements, and a plurality of coupling holes respectively coupled to the coupling hole on the rack body by the coupling elements for enabling the tray to be moved up and down in the rack body within a limited range.

DETAILED DESCRIPTION OF THE PREFERRED EMBODIMENTS

Figure 1:
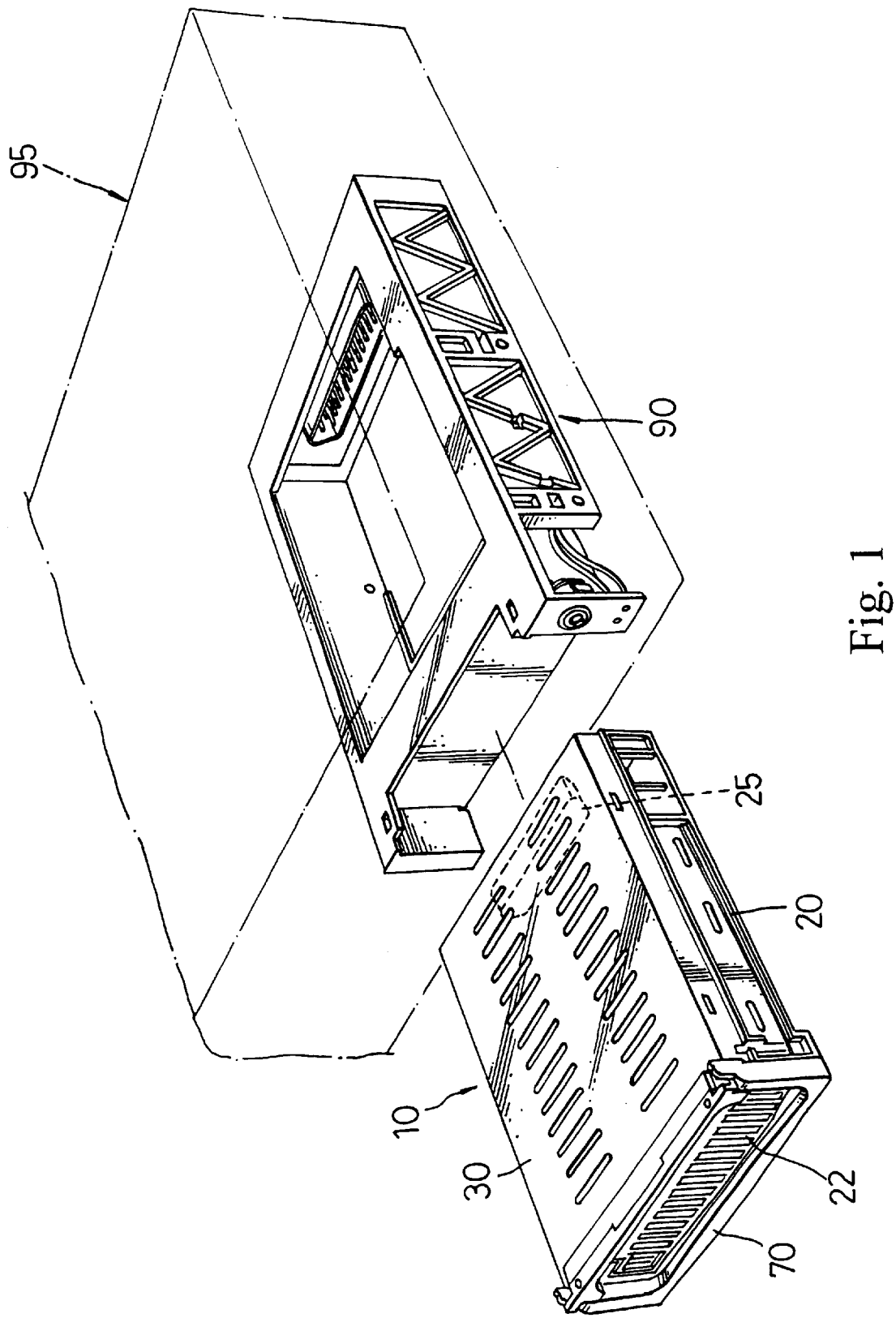
FIG. 1 is a schematic drawing showing the relationship between the hard diskdrive mobile rack and the receiving shell in the mainframe of a computer.
Figure 2:
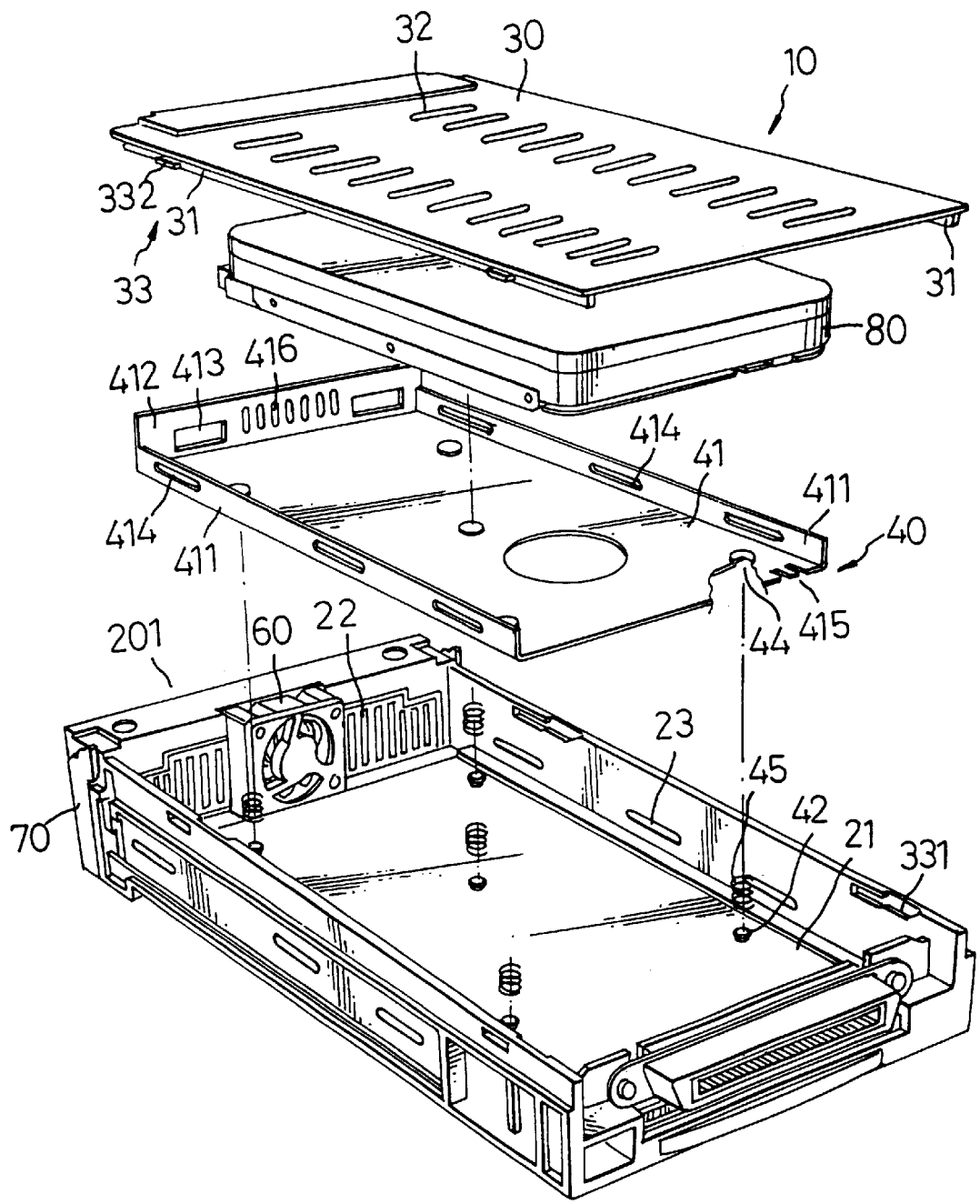
FIG. 2 is an exploded view of a hard diskdrive mobile rack according to one embodiment of the present invention.
Figure 3:
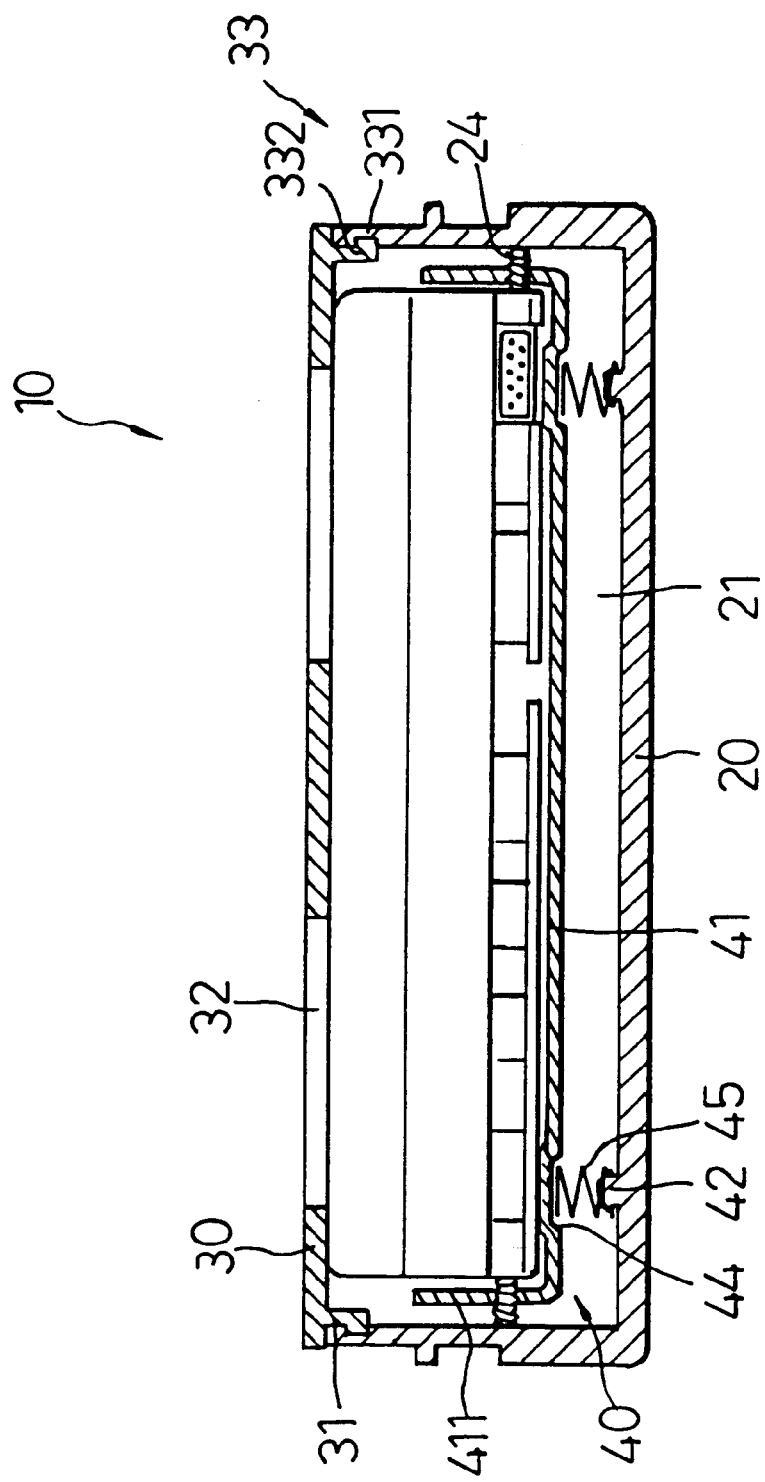
FIG. 3 is a sectional assembly view of the hard diskdrive mobile rack shown in FIG. 2.

Referring to FIGS. from 1 through 3, a hard diskdrive mobile rack 10 is provided to hold a hard diskdrive 80, comprised of a casing 20, a top cover 30, and a buffer unit 40.

As illustrated in FIG. 1, the mobile rack 10 is inserted into a receiving shell 90 and electrically coupled thereto, which receiving shell 90 is mounted inside a computer mainframe 95 for enabling the computer mainframe 95 to use the hard diskdrive 80 for storing data. According to the first embodiment of the present invention, the body 20 comprises an opening 21, a plurality of air vents 22, a plurality of side holes 23, and an electric connector 25. The air vents 22 are disposed on the shell of the peripheral wall of the body 20 through which heat from the hard diskdrive 80 is dissipated into the air outside the body 20. According to this first embodiment, the body 20 has a front side 1 201, and a rear side 202. The air vents 22 are formed on the front side 202 of the body 20, and the electric connector 25 is installed in the rear side 202 of the body 20. Further, a fan 60 is mounted inside the body 20, and attached to the air vents 22. When operated, the fan 60 causes outward currents of air to carry heat away from the hard diskdrive 80 to the outside of the body 20 through the air vents 22. After installation in the body 20, the hard diskdrive 80 is electrically connected to the electric connector 25. Further, a handle 70 is provided at the front side 201 of the body 20. According to this embodiment, the handle 70 is pivoted to the front side 201 of the body 20. Through the handle 70, the mobile rack 10 can be conveniently inserted into or pulled out of the shell 90 in the computer mainframe 95 by hand. The pivoting structure between the handle 70 and the body 20 can be achieved by any of a variety of conventional techniques. Taiwan Patent Application Serial No.86200599, which was filed by the present inventor, discloses a related pivoting arrangement.

The top cover 30 is made of heat-resisting aluminum, detachably positioned on the body 20 by positioning means 33 to close/open the opening 21. The positioning means 33 comprises a plurality of sliding coupling grooves 331, and coupling ribs 332. The sliding coupling grooves 331 are formed on the inside of the body 20 and disposed at two opposite sides of the opening 21. The coupling ribs 332 are respectively raised from two parallel bottom rails 31 at the top cover 30 at an outer side corresponding to the sliding coupling grooves 331 on the body 20. The top cover 30 is slidably inserted into the body 20 to close/open the opening 21. After insertion of the top cover 30 into the body 20, the coupling ribs 332 are respectively engaged into the sliding coupling grooves 331. In order to facilitate dissipation of heat, air vents 32 are formed on the top cover 30.

The buffer unit 40 is comprised of a tray 41, which carries the hard diskdrive 80, and a plurality of spring elements 45, which support the tray 41 in the body 20. The tray 41 is made of metal material, comprising two opposite upright side walls 411, a plurality of side holes 414 respectively disposed on the upright side walls 411 respectively coupled to the side holes 23 on the body 20 by coupling elements 24, an upright front wall 412 connected between the upright side walls 411 at the front side thereof for EMI (electromagnetic interference) protection, a plurality of air vents 416 on the upright front wall 412 for quick dissipation of heat, a plurality of wire holes 413 for the distribution of the signal lines of the hard diskdrive 80, and a grounding terminal 415 for grounding of the hard diskdrive 80. The coupling elements 24 can be, for example, screw bolts. The diameter of the screw bolts 24 is smaller than the side holes 414 and 23, such that the tray 41 and the hard diskdrive 80 can be slightly moved up and down within a limited range. The spring elements 45 are supported between the body 20 and the tray 41. For positive positioning of the spring elements 45 between the body 20 and the tray 41, recessed portions 44 are formed on the bottom side wall of the tray 41 and upright stub rods 42 are provided inside the body 20 corresponding to the recessed portions 44. The upright stub rods 42 preferably have a cone head for positive positioning of the spring elements 45. The spring elements 45 each have a bottom end fastened to one upright stub rod 42, and a top end stopped at one recessed portion 44. When the mobile rack 10 is vibrated, the spring elements 45 eliminate shocks from the hard diskdrive 80.

Figure 4:
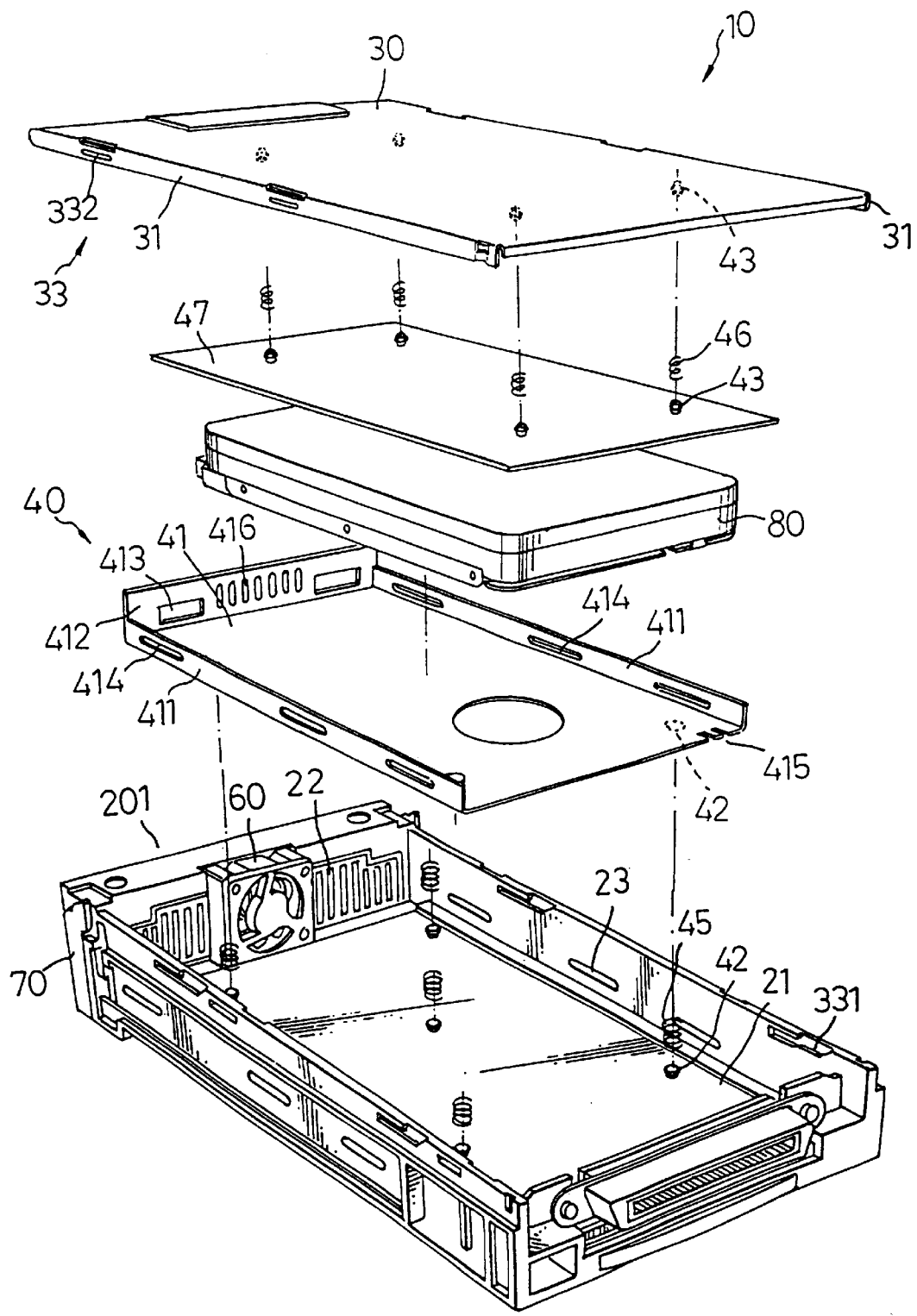
FIG. 4 is an exploded view of a hard diskdrive mobile rack according to a second embodiment of the present invention.
Figure 5:
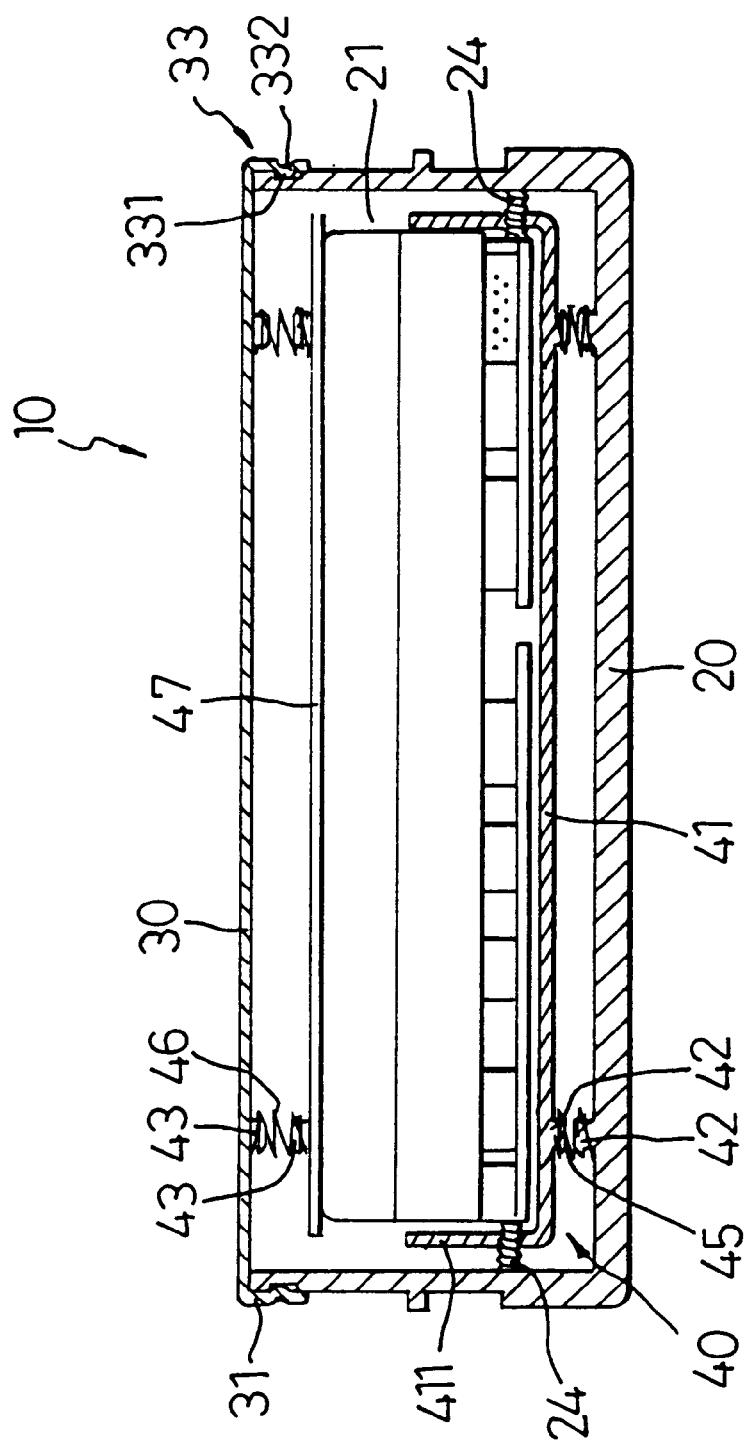
FIG. 5 is a sectional assembly view of the hard diskdrive mobile rack shown in FIG. 4.

FIGS. 4 and 5 show an alternate form of the present invention. According to this alternate form, the sliding coupling grooves 331 of the positioning means 33 are formed on the outside of the body 20 and disposed at two opposite sides of the opening 21, and the coupling ribs 332 are respectively raised from two parallel bottom rails 31 at the top cover 30 at an inner side corresponding to the sliding coupling grooves 331 on the body 20. The buffer unit 40 further comprises a sheet 47, and a plurality of spring elements 46 connected between the top cover 30 and the sheet 47. Cone head stub rods 43 are respectively provided at the bottom sidewall of the top cover 30 and the top sidewall of the sheet 47 for the positioning of the spring elements 46. The sheet 47 is stopped at the top sidewall of the hard diskdrive 80. Air vents (not shown) may be made on the sheets 47. According to this embodiment, cone head stub rods 42 also provided inside the body 20 and at the bottom sidewall of the tray 41 for the positioning of the spring elements 45, which support the tray 41 in the body 20.

It is to be understood that the drawings are designed for purposes of illustration only, and are not intended for use as a definition of the limits and scope of the invention disclosed. For example, any of a variety of known coupling structures may be used instead of the aforesaid positioning means 33.

What the invention claimed is:

1. A hard diskdrive mobile rack mounted in the mainframe of a computer to hold a hard diskdrive in the mainframe of the computer for storing data, the mobile rack comprising:

a hollow rack body, said rack body comprising an opening through which a hard diskdrive is inserted into the inside of said rack body, a plurality of air vents for dissipation of heat from the loaded hard diskdrive, a plurality of coupling holes, and an electric connector electrically connected to the mainframe of the computer;

a heat-resisting top cover for closing the opening of said rack body;

positioning means for enabling said top cover to be secured to said rack body; and a buffer unit for supporting the loaded hard diskdrive in said rack body, said buffer unit comprising a tray, which holds the loaded hard diskdrive in said rack body, and a plurality of spring elements, which support said tray in said rack body, said tray comprising a plurality of coupling elements, and a plurality of coupling holes respectively coupled to the coupling hole on said rack body by said coupling elements for enabling said tray to be moved up and down in said rack body within a limited range.

2. The hard diskdrive mobile rack of claim 1 wherein said rack body further comprises a plurality of air vents on a front sidewall thereof, and at least one fan disposed on the inside adjacent to the air vents on the front sidewall.

3. The hard diskdrive mobile rack of claim 1 further comprising a handle pivoted to said rack body at a front side.

4. The hard diskdrive mobile rack of claim 1 wherein said rack body is inserted with said top cover and said buffer unit into a receiving shell inside the mainframe of the computer, enabling the electric connector of said rack body to be electrically connected to the mainframe of the computer.

5. The hard diskdrive mobile rack of claim 1 wherein said positioning means comprises a plurality of sliding coupling grooves provided at said rack body at two opposite sides of said opening, and a plurality of coupling ribs respectively provided at said top cover at two opposite lateral sides for coupling to said sliding coupling grooves.

6. The hard diskdrive mobile rack of claim 1 wherein said top cover comprises a plurality of air vents.

7. The hard diskdrive mobile rack of claim 1 wherein said top cover is made of metal material.

8. The hard diskdrive mobile rack of claim 1 wherein said tray comprises an upright front wall, a grounding terminal, and at least one wire hole.

9. The hard diskdrive mobile rack of claim 1 wherein said rack body and said tray each comprise a plurality of stub rods for the positioning of said spring elements.

10. The hard diskdrive mobile rack of claim 1 wherein said rack body and said tray comprise respectively a plurality of stub rods and a plurality of recessed portions for the positioning of said spring elements.

11. The hard diskdrive mobile rack of claim 1 wherein said buffer unit further comprises a sheet member stopped at the loaded hard diskdrive at a top side, and a plurality of spring elements connected between said top cover and said sheet member.

12. The hard diskdrive mobile rack of claim 11 wherein said sheet member is made of heat-resisting material.

13. The hard diskdrive mobile rack of claim 11 wherein said sheet member comprises a plurality of air vents.

14. The hard diskdrive mobile rack of claim 11 wherein said sheet member and said top cover comprise a plurality of stub rods for the positioning of the respective spring elements.

* * * * *